Nov. 6, 1962  R. C. LAYNE  3,061,855
DOCKBOARD UNIT
Filed July 22, 1959  6 Sheets-Sheet 1

INVENTOR.
RICHARD C. LAYNE

BY MAHONEY, MILLER & RAMBO,
ATTY'S.

FIG.1

Nov. 6, 1962 R. C. LAYNE 3,061,855
DOCKBOARD UNIT
Filed July 22, 1959 6 Sheets-Sheet 2

FIG. 2

INVENTOR.
RICHARD C. LAYNE
BY MAHONEY, MILLER & RAMBO,
ATTY'S.

Nov. 6, 1962 R. C. LAYNE 3,061,855
DOCKBOARD UNIT
Filed July 22, 1959 6 Sheets-Sheet 5

INVENTOR.
RICHARD C. LAYNE
BY
MAHONEY, MILLER & RAMBO, ATTY'S.

Nov. 6, 1962    R. C. LAYNE    3,061,855
DOCKBOARD UNIT

Filed July 22, 1959    6 Sheets-Sheet 6

INVENTOR.
RICHARD C. LAYNE
BY
MAHONEY, MILLER & RAMBO, ATTY'S.

United States Patent Office 3,061,855
Patented Nov. 6, 1962

1

3,061,855
DOCKBOARD UNIT
Richard C. Layne, Columbus, Ohio, assignor to Auto-Mechanical Dock Board, Inc., Columbus, Ohio, a corporation of Ohio
Filed July 22, 1959, Ser. No. 828,873
11 Claims. (Cl. 14—71)

My invention relates to a dockboard unit. It relates, more specifically, to a structure which includes a dockboard that is mounted on a dock for vertical movement and that is moved vertically by a truck backing into association with the unit so that it will engage the bed of the truck to provide a ramp or bridge between the dock and the bed of the truck even if they are at different levels.

One of the objects of my invention is to provide a dockboard unit of the type indicated which is actuated solely by the truck or other vehicle backing into association therewith and subsequently moving away therefrom.

Another object of my invention is to provide a dockboard unit which includes a vertically movable ramp or board that normally, before engagement of the unit by a truck, rests in a lowered position, substantially flush with the dock, that is a cross-traffic position, so as not to interfere with movement about the dock of material or material-handling equipment.

Another object of my invention is to provide a dockboard structure which is designed and fabricated as a shallow unit so that it can fit into a shallow pit as compared to prior art units.

Still another object of my invention is to provide a dockboard unit of the type indicated above in which the actuating mechanism provided for producing the vertical movement of the board or ramp member is not connected to such vertically movable member and normally when in cross-traffic position does not exert an upward raising force thereon which might tend to damage an overhead door at the edge of the dock having its lower edge in engagement with the board or ramp.

A further object of my invention is to provide a dockboard unit in which the actuating and control mechanism is so associated with the dockboard or ramp that if there is a load on the board, such as a person or forklift truck standing on it, when it is in its cross-traffic position, the board will not be raised even if a truck or other vehicle engages the actuating mechanism thereof by backing into association therewith, and thereby a safety factor is provided.

Another object of my invention is to provide a bumper structure associated with the outer end of the unit which will prevent damage to the unit as the truck moves the actuating mechanism thereof.

A further object of my invention is to provide a dock unit which, as previously indicated, can be mounted in a shallow pit in the dock and the actuating mechanism of which is substantially sealed in the pit, with the board or ramp in a cross-traffic position, so that the structure is weatherproof and rodent-proof.

Various other objects will be apparent.

According to my invention, the dockboard unit comprises a shallow main frame which is adapted to be disposed in a pit within the dock at its outer edge. The unit includes a dockboard which has its inner end pivoted to the upper and inner corner of the frame for vertical swinging movement so that its outer end can adjust to the height of the truck body whether it is higher or lower than the dock floor surface or deck. Normally, the dockboard is held by gravity in its lowermost horizontal or cross-traffic position and when in this position, it is supported by legs which are in vertical supporting position but which are pivoted to the outer and lower corner of the main frame for swinging movement inwardly into non-supporting position. Mechanism is supported within the main frame for controlling the vertical swinging movement of the pivoted board and this mechanism serves to first raise the board and then to permit lowering of it into contact with the bed of a truck backed into association therewith. This mechanism is controlled by means of an actuating slide, which moves relative to an associated sealing wall structure at the outer end of the dockboard unit, and is normally in extended position to be engaged by a truck backing into cooperation with the dock. When so engaged by the backing truck, the slide is pushed inwardly into retracted position and this actuates the mechanism which controls the vertical swinging movement of the board, as indicated above. Simultaneously, with the upward movement of the board, resulting from inward movement of the actuating slide, the cross-traffic supporting legs are swung inwardly from their normal vertical supporting position to non-supporting positions. This will permit the outer end of the board to move downwardly, even below the level of the top of the main frame if necessary. The downward movement of the board into engagement with the truck bed is initiated and completed merely by the weight of the dockboard as the control mechanism is controlled by the slide. As the slide reaches the extent of its necessary actuating movement, bumpers are arranged to contact the back of the truck to prevent over-movement of the slide and damage to the unit. Upon outward or extending movement of the slide, which occurs automatically, as the truck moves away from the dock, the mechanism is controlled by the actuating slide to first raise the dockboard and then to permit lowering of the board by gravity to its normal cross-traffic position and before it reaches such position, the supporting legs are moved into vertical supporting position by the outward movement of the slide to support the outer end of the board in such normal cross-traffic position. A yieldable lost motion connection is provided between the slide and the mechanism for controlling vertical movement of the board or ramp so that if there is a load on the board when it is in cross-traffic position, such mechanism will not raise the load even if the actuating slide is pushed inwardly by a backing truck.

The preferred embodiment of my invention is illustrated in the accompanying drawings but it is to be understood that specific details thereof may be varied without departing from basic principles of my invention.

In the drawings:

FIGURE 4 is a vertical sectional view taken along line

4—4 of FIGURE 1 showing mechanism provided for controlling vertical movement of the dockboard.

FIGURE 5 is a plan view taken along line 5—5 of FIGURE 4.

Figure 1:
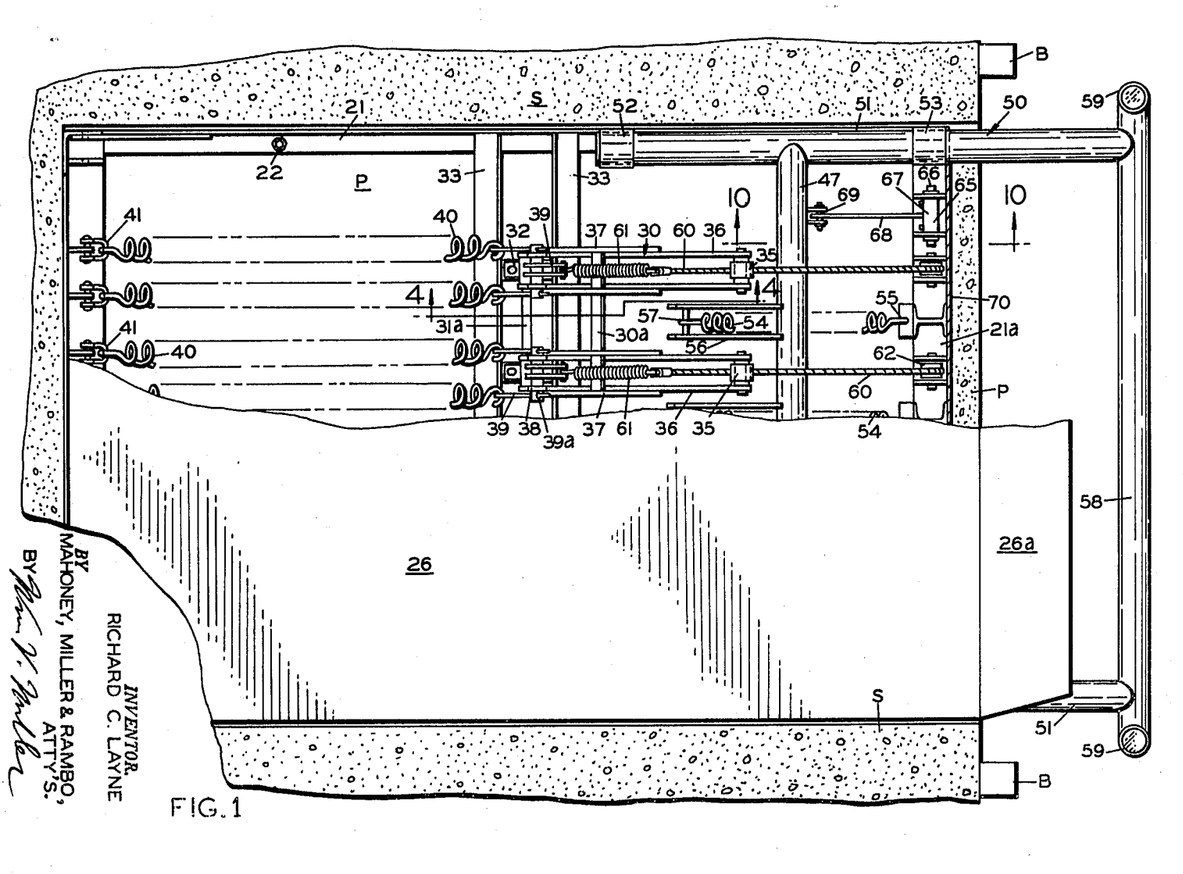
FIGURE 1 is a plan view, partly broken away, of a dockboard unit in which my invention is embodied.
Figure 2:
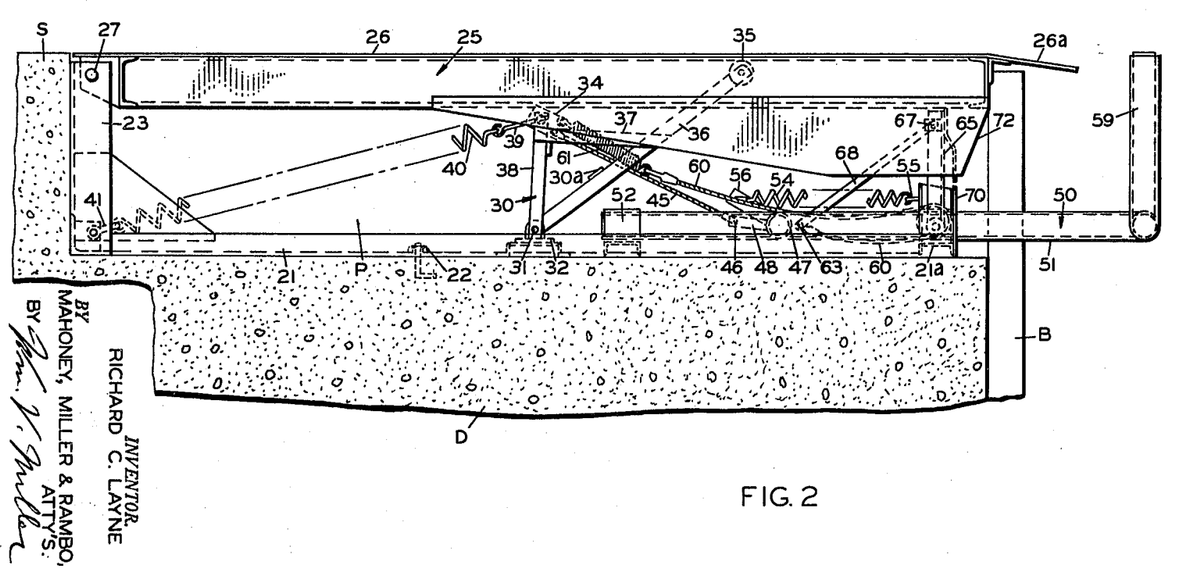
FIGURE 2 is a side elevational view of the unit of FIGURE 1.
Figure 3:
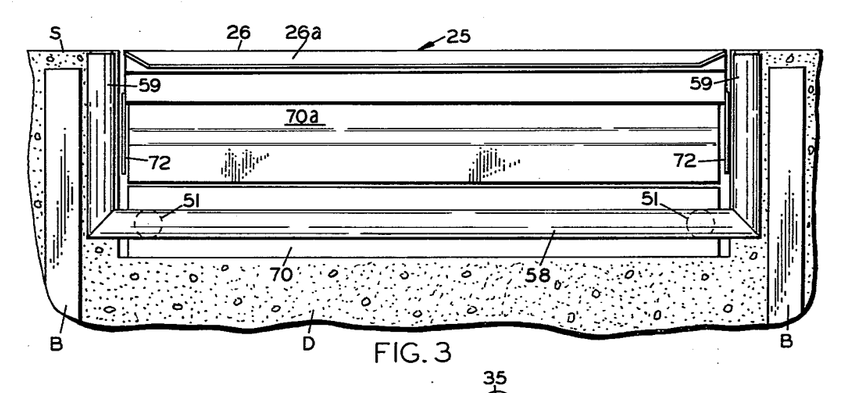
FIGURE 3 is an elevational view of the outer or truck-engaging end of the dockboard unit of FIGURES 1 and 2.

With reference to the drawings, in FIGURES 1, 2 and 3 I have illustrated the general structure of my dockboard unit. The unit comprises a main frame 21 which is fabricated from suitable metal members and which is of elongated flat form. When the unit is installed, this frame is disposed within a shallow pit P below the flat upper surface S of a dock D. This pit is open at its top and outer end. The frame 21 may be bolted in place by means of bolts 22 embedded in the concrete or other material of the walls of the pit.

The frame 21 includes the rigid rear upstanding dockboard-supporting frame portion or standard 23 which supports the dockboard or ramp 25. This board 25 comprises suitable metal supporting beams and cross members which carry on their upper edges surface plates 26 which are normally flush with the adjacent surface S of the dock. The inner or rear end of the board 25 is pivoted on a transverse axis 27 to the upper end of the supporting standard 23. The outer end of the dockboard 25 is provided with a projecting lip or extension 26a for contacting the bed of a truck when the board is moved into association therewith. Thus, the board 25 is supported for vertical swinging movement about the pivot axis 27.

In order to control vertical swinging movement of the board 25, suitable mechanism is supported within and by the main frame 21. This mechanism includes rocker frames or bell crank lever frames 30 which are pivoted for vertical swinging movement about the transverse axis 31 (FIGURE 2) provided by brackets 32 that are suitably attached to the main frame at transversely spaced intervals along the transverse frame members 33 of the main frame 21 which are located about midway of the inner and outer ends of the main frame. The lever frames 30 are arranged in pairs, a pair being provided at each side of the center line of the frame 21 and being carried by a pivot shaft 31a (FIGURE 1) carried by a pair of the brackets 32. The levers 30 of each pair are rigidly connected together by a transversely extending connecting bar 30a.

Figures 4, 5:
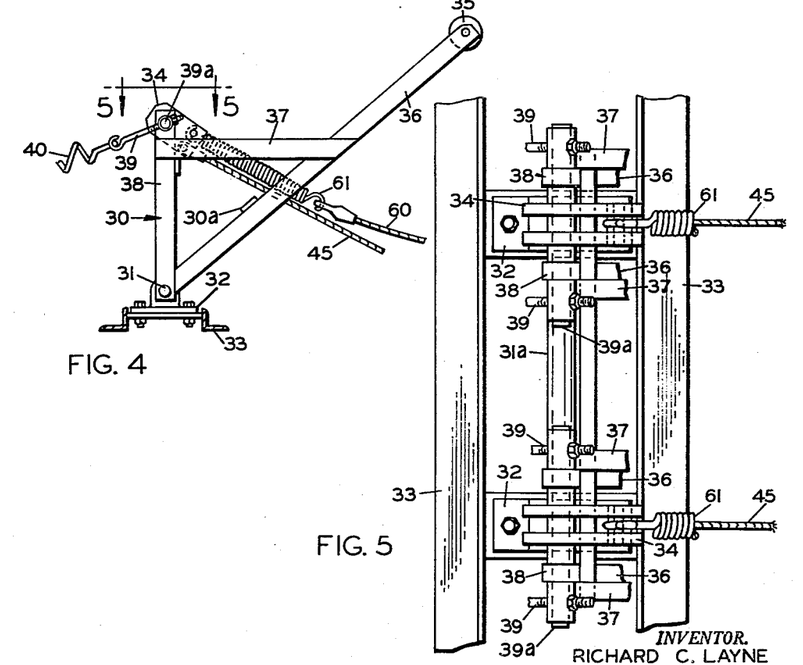

Each lever frame 30 is of bifurcated form (FIGURE 1) and carries a roller 35 disposed between the outer and upper ends of a pair of laterally spaced angularly extending bars 36 (FIGURE 4) which extend outwardly and upwardly from the pivot axis 31. Rigidly attached to the bars 36 are pairs of bars 37 and 38 which are at right angles to each other and at the right angle of the triangle thus formed an adjustable connecting bolt 39 is provided for connecting a spring 40 to the lever frame 30. The bolts 39 are carried by a transverse pivot shaft 39a mounted in upward extensions of the bars 38. A pair of these springs 40 is provided for each frame 30 and these springs are tension springs which are pivotally anchored to the lower rear corner of the main frame 21 (FIGURE 1) by clevis connections 41. The springs 40 exert tension on the lever frames 30 which tend to swing them upwardly and inwardly about the pivot axis 31. This tends to swing the rollers 35 upwardly toward the board 25 and at times into engagement with the lower surface of the plates 26 thereof.

Means is provided for normally overcoming the tendency of the springs 40 to swing the frames 30 about the pivot axis 31 so that the board normally rests in a cross-traffic position. This means comprises a cable or other flexible connecting member 45 (FIGURES 1, 4 and 5) connected to each of the frames 30 by a bracket 34 at its upper inner corner, the bracket 34 being also mounted on the pivot shaft 39a. The forward end of each of these cables is connected at 46 (FIGURE 2) to a rigid arm 48 extending inwardly and upwardly from a transverse tubular member 47 (FIGURES 1 and 2) that is part of an actuating slide 50. This actuating slide 50 comprises a pair of longitudinally extending outer arms 51 which are slidably mounted in pairs of tubular bearings 52 and 53 on the outer portion of the frame 21. Tension springs 54 are provided for normally urging this slide 50 outwardly into extended position as shown in FIGURES 1 and 2. Any suitable number of these springs 54 may be provided but in the unit shown three are used but only two are shown in FIGURE 1.

Each tension spring 54 is anchored to the cross member 21a of the main frame 21 at its outer end, as indicated at 55, and at its inner end is anchored to the slide 50 by means, including the inwardly and upwardly extending brackets 56, as indicated at 57, the brackets being carried by the transverse tubular member 47. The combined effect of the springs 54 is sufficient normally to overcome the combined effect of the springs 40. Therefore, the frames 30 will normally be swung outwardly and downwardly so that the rollers 35 will not contact with the dockboard plates 26, as indicated in FIGURE 2.

It will be apparent from FIGURES 1, 2 and 3 that the forward end of the slide 51 is provided with a bumper structure of U-form consisting of the transverse tubular member 58 and the upstanding side members 59. The dockboard 25 is of slightly less width than the lateral spacing of the upstanding side bumper members 59 to permit movement of the board downwardly therebetween when necessary.

Another connecting structure is provided between the rocket levers 30 and the slide 50 in addition to the cross-traffic position maintaining or board lowering control cable 45. This structure comprises a board-raising control cable or flexible member 60 associated with each lever frame 30 and which has its rear end connected to a tension spring 61 which is attached to the bracket 34 (FIGURES 1, 2, 4 and 5) at the inner and upper corner of the frame 30. Each cable 60 passes outwardly around an idler pulley 62 mounted on the cross frame member 21a at the outer and lower corner of the frame 21. The cable 60 then passes downwardly and inwardly under the pulley 62 and has its inner end anchored to the slide 50 at the point 63 which is on a lug carried by the transverse member 47 of the slide.

Figures 10, 11, 12:
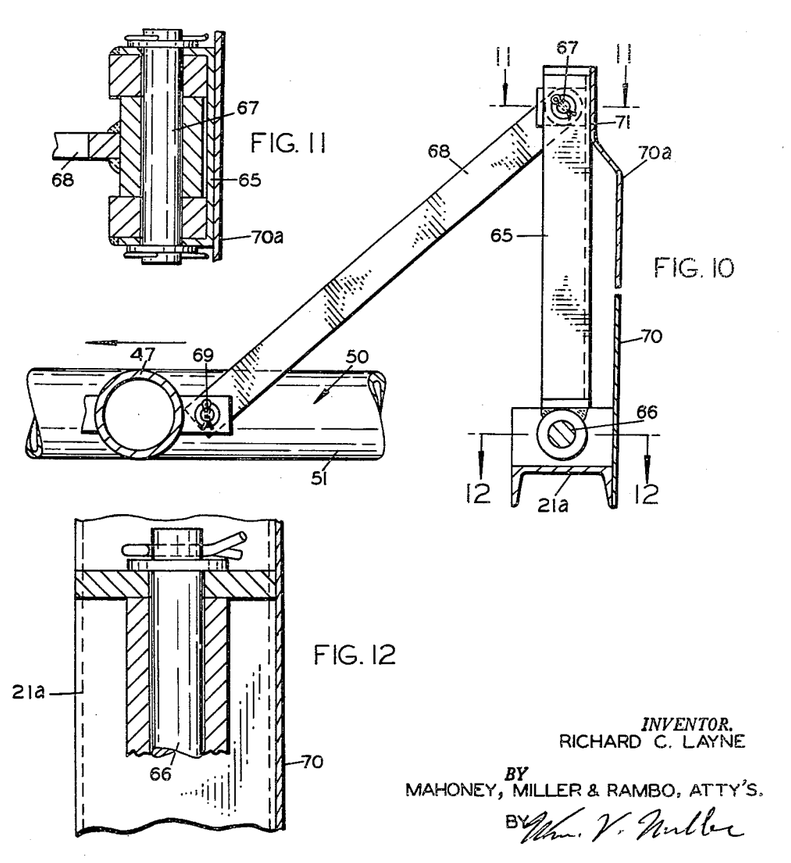
FIGURE 10 is a fragmentary vertical sectional view taken along line 10—10 of FIGURE 1 showing the cross-traffic supporting structure for the board.
FIGURE 11 is a horizontal sectional view taken along line 11—11 of FIGURE 10.
FIGURE 12 is a horizontal sectional view taken along line 12—12 of FIGURE 10.

The dockboard 25 normally rests in the cross-traffic position shown in FIGURES 1 and 2 since the rollers 35 will be spaced below the board by a pull exerted by the springs 54 through the cables 45 and at this time the board is supported by means of a pair of upstanding supporting legs 65. Each of the legs 65 is pivoted at its lower end, as indicated at 66 (FIGURES 1 and 10), to the transversely extending frame member 21a at the outer and lower corner of the frame 21. The upper end of each leg 65 is pivoted at 67 (FIGURES 1, 10 and 11) to the outer and upper end of a link 68. This link 68 has its lower end pivoted at 69 to a lug projecting outwardly from the transverse member 47 of the actuating slide 50. With the slide 50 in extended condition, the legs 65 are held upright so that the board 25 will rest on such legs, it being apparent that at this time the rollers 35 will not contact the board 25, so as to permit it to rest on the legs. However, as soon as the slide 50 is moved inwardly, the links 68 will serve to swing the legs 65 inwardly out of supporting or interfering relationship with the board 25. At this time, the board will be free to move downwardly between the upstanding bumper members 59 of the slide if necessary.

In order to substantially seal the outer end of the pit P to make it substantially weatherproof and rodent-proof, the forward frame member 21a is provided with an upstanding wall 70 which is attached thereto and which extends the full length thereof. This wall 70 with the legs 65 upright extends upwardly almost into edge contact with the lower edge of a depending wall 70a which extends between the legs and is attached thereto, as indicated at 71 in FIGURES 3 and 10. Normally extending downwardly in overlapping relationship to the ends of the wall 70 are the side skirts 72 which depend from the dockboard 25, as indicated in FIGURE 2. Thus, the outer end of the pit will be substantially closed by a cooperating wall structure when the unit is in normal or cross-traffic position. The wall 70a will move out of place with the inward swinging of the legs 65 but the skirts 72 simultaneously move downwardly as the board 25 swings downwardly sometimes to a position even lower than that illustrated in FIGURE 2 which may sometimes be necessary. If the dockboard 25 rests on the bed of a truck so that it is higher than the dock surface S, the skirts 72 will depend into overlapping relationship to the sides of the pit to prevent insertion of the feet or objects beneath the board at its side edges. The outer arms 51 of the slide 50 extend slidably through openings in the wall 70 (FIGURE 3) and thus maintain the substantially sealed condition at the outer end of the unit.

On the outer edge of the dock D, just outside the path of movement of the upright bumper portions 59 of the actuating slide 50, fixed bumpers B are provided. These bumpers are vertically disposed and project outwardly from the dock to such an extent that a truck can back thereagainst with the bumper of the slide 50, including members 58 and 59, completely retracted therewithin. This will prevent damage to the slide as the truck moves it inwardly and will limit the extent of inward movement of the slide.

Figure 6:
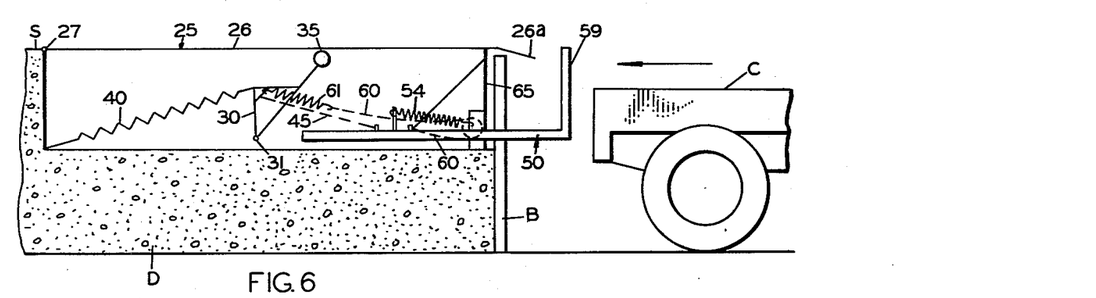
FIGURE 6 is a diagrammatic view in side elevation showing a truck backing into cooperation with the extended actuating slide before actual contact therewith.

In the use of this dockboard unit, assuming that it is in the condition illustrated in FIGURES 1, 2 and 6 with the slide 50 extended and a truck with a bed C is backing into association therewith, as indicated in FIGURE 6, the unit will function in the manner now to be described. The springs 54 will be pulling the slide 50 outwardly into extended condition and since these springs overcome the springs 40 through the taut cross-traffic position-maintaining cables 45, the frames 30 will be swung outwardly and downwardly so that the rollers 35 will not contact the board 25 as shown in FIGURE 6. Furthermore, with the slide 50 in this position, the supporting legs 65 will be upright and the board 25 will rest on the upper ends thereof and be held there by gravity. At this time also, there will be slack in the board-lowering control cables 60 because of the downward and outward swinging of the frames 30 and the predetermined lengths of the cables. Thus, the board 25 will be in a cross-traffic position at this time, as indicated in FIGURE 6.

Figure 7:
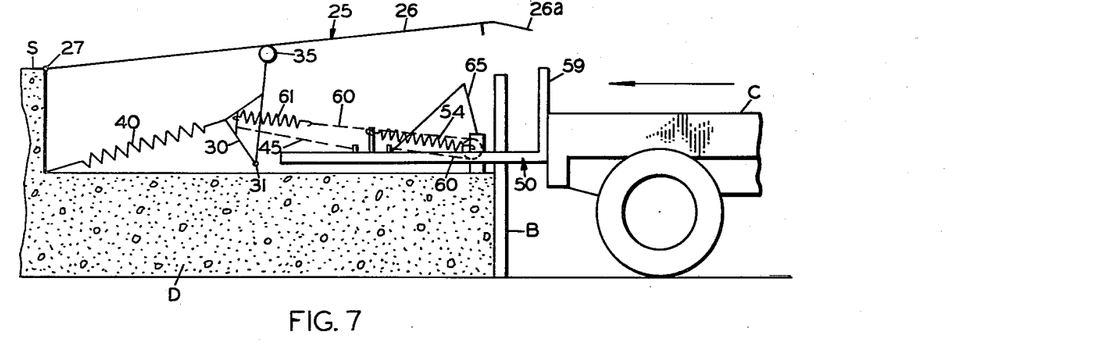
FIGURE 7 is a similar view showing initial retracting contact of the truck with the actuating slide which serves to raise the dockboard or ramp.

As soon as the truck contacts the bumper members 58 and 59 of the slide 50 and starts to push the slide inwardly into retracted position, the tension on the cables 45 is eased and the springs 40 will, therefore, swing the lever frames 30 upwardly and inwardly about the pivot axis 31. This will swing the rollers 35 upwardly against the plates 26 of the dockboard 25 and will swing the dockboard 25 vertically about the pivot axis 27. Although the inward movement of the slide 50 tends to create slack in the cables 45, this will be immediately taken up by the springs 40 swinging the frames 30 inwardly and upwardly. The slack in the cables 60 will be taken up by inward movement of the slide 50 and as these cables become taut, by the cables being pulled inwardly around the pulleys 62, there will be a pull exerted by the pulleys on the springs 61. This occurs at the position of the board 25 illustrated in FIGURE 7 in which its lip 26a is well above the surface of the bed C of the truck. At this time the legs 65 are also swung inwardly, as indicated in FIGURE 7.

Figure 8:
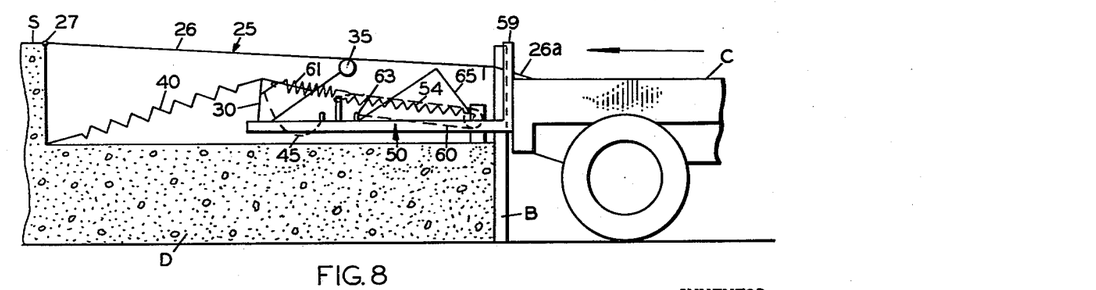
FIGURE 8 is a similar view showing the slide as it nears completely retracted position with the dockboard lowered into contact with the truck body.

As the truck continues to back and push the slide 50 inwardly, the pull on the cables 60 is increased and this opposes the force exerted by the springs 40 so as to exert a pull through the springs 61 to swing the lever frames 30 outwardly and downwardly to swing the rollers 35 downwardly, as indicated in FIGURE 8. The springs 61 will be of sufficient strength to overcome, without extending, the pull in the opposite direction exerted by the springs 40. Slack will develop in the cables 45 but the cables 60 will be under tension at this time. This will serve to allow the board 25 to settle downwardly until the lip 26a of the board rests on the bed of the truck, as indicated in FIGURE 8.

Figure 9:
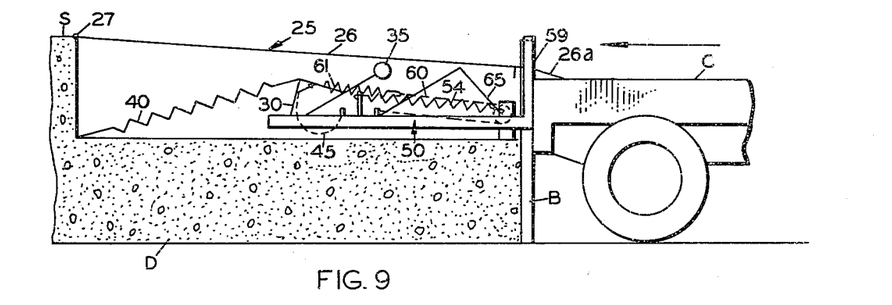
FIGURE 9 is a view almost like FIGURE 8 with the slide moved completely into retracted position.

As indicated in FIGURE 9, further backing of the truck until it engages the bumpers B on the dock will swing the levers 30 outwardly and downwardly even farther so that the rollers 35 will move out of contact with the board 25. At this time, the board will be supported solely at the pivot support 27 and at the lip 26a by the truck body. If the lip 26a rests on the truck body before the slide 50 reaches the extent of its inward movement, the springs 61 will merely be extended by the pull exerted by the cables 60. Thus, the springs 61 provide a lost-motion connection between the slide 50 and the levers 30.

The springs 40 are selected so that their combined effect will just be sufficient to lift the board 25 about the pivot axis 27. If there is any load on the board when it is in its cross-traffic position, the springs 40 cannot lift it even though the slide 50 is moved inwardly by a truck backing thereagainst. Under such a condition, the slide 50 will be moved inwardly without raising the board. The slack in the cables 60 will first be taken up by inward movement of the slide, the board will be supported by the rollers 35 as the legs 65 swing inwardly, but the springs 61 will merely be extended by the pull of the cables 60. If the bed of the truck is at such a level that it contacts the lip 26a, the slide 50 will not move inwardly sufficiently to swing the supporting legs 65 out of supporting position. However, if the truck bed is lower than the lip 26a, the legs 65 will swing inwardly and the lip will eventually rest on the truck bed but the board 25 will not be moved upwardly by the levers 30.

Outward movement of the truck from the position of FIGURE 9 will permit the springs 54 to return the slide 50 to its original position. This will first release the tension on the cables 60 permitting the lever frames 30 to be swung upwardly and inwardly by the springs 40 thereby causing the rollers 35 to lift the board 25. Further outward movement of the slide 50 will restore tension in the cable 45 to exert an outward pull on the frames 30 swinging them outwardly and downwardly and thereby lowering the rollers 35 and at the same time swinging the legs 65 upwardly and outwardly to vertical supporting position, thereby permitting the outer end of the board 25 to settle by gravity into horizontal or cross-traffic position where it will rest on the upper ends of the legs 65.

Figure 13:
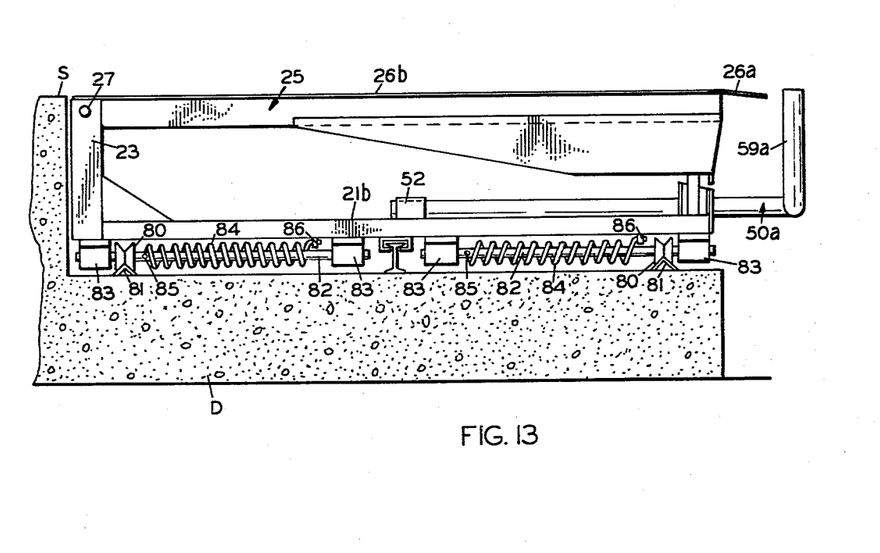
FIGURE 13 is a side elevational view of a dockboard unit having the structure shown in the preceding figures but having additional structure for permitting mounting it for limited lateral movement.

In some installations it may be desirable to have the unit supported for limited lateral movement to permit transverse alignment with the bed of the truck. In such an installation the arrangement shown in FIGURE 13 may be used. All parts of the unit will be the same as previously described but additional structure will be provided for this purpose. The same structure is provided at both sides of the frame 21b but only one side is shown in FIGURE 13. Thus, the frame 21b is carried by four grooved rollers 80 which operate on tracks 81 extending transversely on the bottom of the pit P. These rollers are keyed to shafts 82 which are rotatably mounted in the bearings 83 carried at the lower side of the frame 21b. Surrounding each shaft 82 is a coil spring 84. One end of each coil spring is anchored to the shaft at 85 and its opposite end is anchored to the frame at 86. Lateral movement of the frame 21b in either direction from normally centered position will be permitted and this movement will wind up the springs 84. However, when the force acting to move the frame is released, the springs 84 will unwind and return the frame to centered position. With this arrangement, the surface plates 26b are preferably extended (not shown) at each side of the unit over the adjacent deck surface of the dock. The purpose of the lateral movement of the unit is to permit transverse alignment of the unit with the truck as it backs into association therewith.

Figure 14:
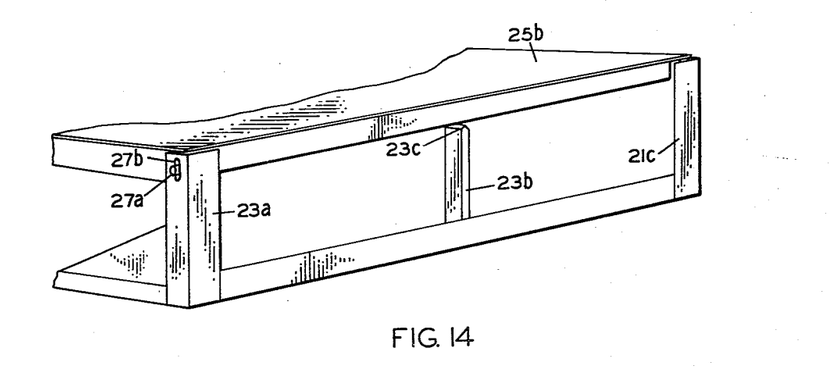
FIGURE 14 is an elevational view of the inner end of the unit showing it equipped with a floating pivot structure which permits transverse tilting of the board.

In some installations it is also desirable to have the dockboard pivoted so that it can tilt transversely to cooperate with a similarly tilted truck bed. Such an arrangement is illustrated in FIGURE 14 and may be used in combination with the structure of FIGURE 13 or without that structure and in combination with the unit disclosed in FIGURES 1 to 12. This structure comprises floating pivots at the inner corners of the dockboard 25b as shown in FIGURE 14. Each pivot comprises a pin 27a which is carried by the corner of the board 25b and which operates in a vertical slot 27b formed in the corner post 23a of the frame 21c. An upstanding fulcrum post 23b is rigidly fixed midway of the posts 23a and is provided with a knife edge 23c about which the board 25b rocks transversely when either pivot structure floats vertically. Thus, the board 25b can automatically tilt transversely about the edge 23c in accordance with the tilting of the bed of the truck on which the lip 26a rests.

It will be apparent from the above description that I have provided a dockboard unit in which all movements of the dockboard are controlled by movement of a truck into and out of association therewith. The movements of the unit are automatically controlled by the actuating slide engaged by the truck. This slide is so connected to the mechanism which controls vertical movement of the dockboard that normally the dockboard rests on the supporting legs in a horizontal or cross-traffic position. In this position, the dockboard will not interfere with movement of materials or equipment over the dock. When a truck moves into association with the slide of the dockboard unit, the board is first positively raised and is then allowed to settle by gravity on the bed of the truck. However, if there is any load on the board, it will not be raised and thereby a safety factor is provided which will prevent injury to a person or damage to equipment which might be on the board as a truck backs into the slide. There is no actual connection between the board and the control mechanism and there is no upward pressure exerted on the board normally. Therefore, there is no possibility of damage to overhead doors which might be used for closing the dock and which will engage the dockboards adjacent their outer ends. The actuating and control mechanism is enclosed in the pit in such a manner that it is substantially weatherproof and rodent-proof.

It will be apparent that many advantages of this dockboard unit have been discussed above but others will be clearly apparent.

Having thus described my invention, what I claim is:

1. A dockboard unit comprising a dockboard pivoted at its inner end for vertical swinging movement from a normal substantially horizontal cross-traffic position where it is held by gravity only, supporting legs pivoted for swinging movement between normal upright supporting position and non-supporting position, said legs in normal upright position supporting the outer free end of the dockboard which will rest thereon, mechanism for controlling the vertical swinging movement of said dockboard, an actuating slide for actuating said mechanism and supported for movement between a position extended forwardly of the free end of said dockboard when in horizontal cross-traffic position and a retracted position by engagement of a truck therewith, yieldable means for normally holding the slide in extended position, an operative connection between said slide and said supporting legs for normally holding them upright, said controlling means comprising yieldable lifting means for applying a predetermined lifting force only to said dockboard, an operative connection between said slide and said controlling means so that the slide in normal extended position will overcome the force of said yieldable lifting means to prevent lifting of the dockboard but will permit operation of said lifting means as the slide is moved into retracted position, said connection between said slide and said supporting legs serving to move them out of supporting position upon movement of the slide into retracted position.

2. A unit according to claim 1 in which the operative connection between said slide and said lifting means includes a cable normally under tension.

3. A unit according to claim 2 in which the operative connection between said slide and said lifting means includes a second cable normally having slack therein but which is brought under tension by movement of said slide into retracted position.

4. A unit according to claim 3 in which the operative connection between said legs and said slide comprises a link pivotally connected between each of the legs and the slide and which will swing the legs about their pivots in response to movement of the slide between extended and retracted positions.

5. A unit according to claim 3 in which the operative connection including said second cable also includes a tension spring connected to said second cable.

6. A dockboard unit according to claim 1 in which said dockboard is pivoted at its inner corners to adjacent supports by floating pivots which permit transverse tilting of the board, said pivots including pivot pins which move vertically in vertically disposed pivot slots.

7. A dockboard unit according to claim 1 in which said legs carry a depending wall cooperating with an upstanding fixed wall at the outer end of said unit said slide being provided with arms slidable in openings in said fixed wall.

8. A dockboard unit according to claim 1 in which said lifting means comprises bell crank levers having rollers for engaging the dockboard, said yieldable means for applying the lifting force comprising springs tending to swing said levers so that the rollers thereof engage said dockboard to apply the lifting force, said yieldable means for moving the slide into extended position comprising springs which normally overcome the force of said lifting springs through the operative connection comprising said first cable.

9. A dockboard unit according to claim 8 in which said operative connection between said slide and said lifting means includes a cable which is connected to said bell crank levers and to said slide so that in extended position of the slide there is slack in the cable, and means for taking up the slack in said cable as the slide is retracted for overcoming the force exerted by said lifting springs and as slack is created in said first cable.

10. A dockboard unit according to claim 9 in which said slide has a bumper thereon to be engaged by a truck, and fixed bumpers between which said bumper moves for engaging a truck to limit retracting movement of said slide.

11. A dockboard according to claim 10 in which the bumper on said slide includes upstanding bumper portions spaced apart sufficiently to permit downward swinging of the free outer end of the dockboard therebetween.

References Cited in the file of this patent

UNITED STATES PATENTS

| | | |
|---|---|---|
| 2,592,919 | Loomis | Apr. 15, 1952 |
| 2,751,615 | Kelley | June 26, 1956 |
| 2,908,024 | Hollen | Oct. 13, 1959 |
| 2,972,762 | McConica | Feb. 28, 1961 |
| 2,994,894 | Loomis | Aug. 8, 1961 |

OTHER REFERENCES

Flow (publication), page 16, May 1956.